United States Patent [19]

Orth, Jr.

[11] 4,105,611

[45] Aug. 8, 1978

[54] ADHESIVE COMPOSITION AND BINDING METHOD

[75] Inventor: George Otto Orth, Jr., Seattle, Wash.

[73] Assignee: Norfin, Inc., Seattle, Wash.

[21] Appl. No.: 711,740

[22] Filed: Aug. 5, 1976

[51] Int. Cl.² ............................................. C08L 93/00
[52] U.S. Cl. .............................. 260/27 EV; 156/305; 260/28.5 AV; 260/30.6 R
[58] Field of Search .... 260/27 EV, 28.5 R, 28.5 AV, 260/30.6 R; 252/33.4

[56] References Cited

U.S. PATENT DOCUMENTS

| 3,386,936 | 6/1968 | Gordy | 260/27 EV |
|---|---|---|---|
| 3,657,171 | 4/1972 | White | 260/27 EV |

FOREIGN PATENT DOCUMENTS

| 708,663 | 4/1965 | Canada | 260/27 EV |
|---|---|---|---|
| 721,439 | 11/1965 | Canada | 260/27 EV |

*Primary Examiner*—Melvyn I. Marquis
*Attorney, Agent, or Firm*—Dowrey & Cross

[57] ABSTRACT

A hotmelt adhesive composition and a method of applying it to bind sheets. The composition comprises by weight 30% to 40% of an ethylene-vinyl acetate copolymer, 25% to 35% of a wax, 20% to 40% of a modified rosin and 10% to 30% of a tackifier. The method of binding sheets comprises aligning the sheet edges, compressing the aligned sheets a short distance from the edges and contacting the edges with the adhesive composition.

9 Claims, No Drawings

000
ADHESIVE COMPOSITION AND BINDING METHOD

FIELD OF THE INVENTION

This invention relates to a hot melt adhesive composition and to a method of on-line binding of sheets using this adhesive.

BACKGROUND OF THE INVENTION

The collator, sorter, and similar arts in general involve the feeding of sheets into spaced compartments. It is often desirable to bind the sheets collected in each compartment together into a mult-page document. "Off-line" binding refers to the process of removing the sheets from the compartments before binding. "On-line" binding refers to the process whereby the sheets are bound together while still in the compartments.

An on-line binding system requires that the sheets be jogged or aligned and then secured together while still in their compartments. In the creation of an on-line adhesive binding system, as contemplated by the present invention, specific problems to be overcome include devising a method of delivering an adhesive to the sheet edges, devising a method of achieving penetration of the adhesive in and between such edges, and the formulation of an adhesive which is not only a good binding adhesive but which is also compatible with the adhesive delivery method and capable of achieving the necessary penetration.

SUMMARY OF THE INVENTION

A method of on-line binding which does not require movement of either the compartments or the sheets involves the use of a hot melt adhesive and an endless belt or other intermediate surface to deliver the adhesive to the sheet edges. Hot melt adhesives are thermoplastic compositions which require neither solvents nor curing. They are characterized by being solids at room temperature, but being of sufficiently low viscosity at elevated temperature for practical application. Such an adhesive is melted in a glue pot, from which it is deposited onto the endless belt. The belt may be equipped with its own heating means. The coated portion of the belt is then moved into contact with the edges of the sheets, which sheets have been aligned and compressed together along a line spaced a short distance back from the edges to be bound, so that the edges themselves are flared somewhat apart from each other. The still liquid adhesive flows from the belt into the spaces between the flared edges of the sheets and sets to form a tough yet flexible bond.

The formulation of a hot melt adhesive suitable for such a process involves to some extent a compromise between ease of application and quality of the final product. The adhesive must have a low enough viscosity when hot to flow from the pot to the belt and from the belt into the spaces between the flared sheet edges without stringing or balling up on the belt. The unused adhesive should also remain fluid so that it can be returned to the glue pot for reuse. On the other hand, the adhesive when cold must have adequate tensile strength. Further requirements for a suitable adhesive are that it be non-blocking, that it not smoke, decompose, or give off odors when held at the glue pot temperature for reasonable periods of time, and that it set rapidly upon contacting the sheets. The components of the adhesive composition must also be compatible and must not separate at the coldest temperature that the bound sheets can be expected to encounter.

The adhesive of the present invention has a viscosity of less than 5,000 centipoise at 250° F and is comprised of 30–40% of an ethylene-vinyl acetate copolymer, 25–35% of a wax, 20–40% of a modified rosin, and 10–30% of a fluid tackifier. Such a composition has been found to have viscosity characteristics compatible with a moving belt application, to be quick setting, to provide a tough yet flexible bond when set, to be non-blocking, and to be stable against separation at below room temperature and against degradation for reasonable periods at molten temperature.

DETAILED DESCRIPTION OF THE INVENTION

The binding system of the present invention comprises a novel hot melt adhesive and a novel method of applying this adhesive to sheet edges. Such method involves the use of an endless belt or other intermediate surface for transferring the adhesive from a reservoir to the sheets. The adhesive is formulated to be compatable with such application method.

An apparatus suitable for practicing this invention may be comprised of a series of vertically aligned spaced compartments into which sheets are fed by a sorter or collator, jogging means to align the edges of the sheets in each compartment, weight bars to compress together the sheets to be bound, a glue pot, and an endless belt to deliver the adhesive. The weight bar contacts the sheets along a line which is spaced back a short distance from the sheet edges themselves, so that the edges are somewhat flared apart. Such flaring permits the adhesive to flow between the sheets for a short distance, resulting in a more secure bond. The distance between the edges and the weight bar must be great enough to permit the sheet edges to flare apart, but not so great as to allow the sheets to buckle when their edges are contacted by the adhesive-coated belt. A preferred distance is about 0.25 inches.

The endless belt may be constructed of metal and suspended by two vertically spaced pulleys, with the lower pulley serving as the belt driving means. A discharge passageway leading from the lower portion of the glue pot is so positioned that molten adhesive flowing out through the discharge passageway is deposited onto the belt at a point about halfway between the upper and lower pulleys. This flow is controlled by a sliding valve. The pulleys are mounted on a frame which is capable of horizontal movement to and from the compartments or, equivalently, from and to the discharge passageway. Heating and control means are used to maintain the glue pot temperature at between 250° F and 425° F, with 375° F being preferred. Heating means may be used on the belt to keep the belt temperature at about 350° F.

The operation of such an apparatus is as follows. The frame is first moved to a position so that the belt is adjacent to the discharge passageway but spaced from the sheet edges. Then, simultaneously, the valve is opened and the belt set in motion so that a portion of the belt is coated with adhesive. The valve is closed when the length of this portion corresponds to the height of the compartments containing sheets to be bound. The coated portion is then moved around to a position adjacent to these compartments, whereupon the frame is moved so that the coated belt contacts the sheet edges. After about 2 seconds the frame is moved back, withdrawing the belt from the sheets. The adhesive typically cools and sets within about 15 seconds after the withdrawal of the belt. Bound sheets are then removed from their compartments. Means for returning unused glue from the belt to the glue pot may also be provided.

In endless belt machines, suitable operating temperatures, i.e., temperatures of the glue pot and the belt, are determined primarily by the melting point and decomposition point of the adhesive. Too high a temperature will cause the adhesive to give off smoke and decompose. Too low a temperature would require an adhesive which would have insufficient strength at room temperature. Generally, operating temperatures between 250° F and 425° F may be used.

In a machine as described above, the viscosity of the molten adhesive must be low enough to enable it to flow onto and off of the intermediate surface or belt, and from the belt into the spaces between the flared sheet edges, without gelling, stringing or balling up. It has been determined that a viscosity of under 5,000 centipoise, and preferably about 1,000 centipoise, is needed to insure such smooth flow. Low viscosity adhesives, hwoever, tend to be slow setting and to have little tensile strength when set. Since it is required that the adhesive, once set, be capable of holding together the sheets of paper or other objects even after repeated flexing of the adhesive bond, it is important that the set adhesive have considerable tensile strength. For moving belt or similar applications, these competing requirements were found to rule out entire classes of adhesives as candidates. Further limitations are imposed by the requirements that the components of the adhesive composition be compatible, that the composition be non-blocking, stable at its molten temperature, and quick setting. It has been found that certain compositions, described below, comprising an ethylene-vinyl acetate copolymer, a wax, a modified rosin, and a fluid tackifier are uniquely capable of satisfying the above constraints.

The ethylene-vinyl acetate copolymer provides the basic strength of the adhesive composition. The vinyl acetate content of the copolymer may range between 18% and 33% by weight. Below this range the copolymer exhibits too little adhesive to be suitable. Above this range the compatibility of the copolymer with other components, particularly the wax, is unacceptably low. The preferred vinyl acetate content is 28%. The melt index of the copolymer, a measure of its molecular weight, is important to the present invention because of its relationship to viscosity and tensile strength. A decrease in melt index implies a higher molecular weight, a higher strength and a higher viscosity. The viscosity of the adhesive composition is, of course, determined by the nature and concentrations of components besides the copolymer. The melt index of the copolymer is preferably in the range of 15-30 gm/10 minutes. The concentration, by weight, of copolymer in the adhesive composition is between 30% and 40%, with about 33% being preferred.

The primary function of the wax component is to impart anti-blocking characteristics to the composition. Blocking refers to the sticking together of cooled and set portions of the adhesive when they are brought into contact. Waxes which may be used within the scope of this invention are the paraffin waxes and the microcrystalline waxes. Paraffin waxes are preferred over microcrystalline waxes, because compositions using the latter are so quick setting that they tend to ball up on the belt. In addition, paraffin waxes are less expensive. The concentration of wax in the adhesive composition should be between 25% and 35% by weight, with about 30% being preferred. The melting point of the wax may range from 120° F to 165° F, with 138° F to 145° F being preferred.

The modified rosin serves to increase the adhesion and to lower the viscosity of the adhesive composition. The term "modified" here includes the removal of oils and of other non-resinous substances from natural rosin. In addition, it may include stabilization, such as by hydrogenation, to make the rosin more resistant to aging, particularly at the elevated glue pot temperature. Suitable modified rosins include pentaerythrital and glycerol esters of highly hydrogenated rosin, and related compounds having similar viscosity characteristics. The modified rosin may be present in concentrations ranging from 20% to 40% by weight. The preferred concentration is about 24%. The softening point of the modified rosin is preferably in the range of 175° F to 225° F.

The function of the tackifying agent can be seen by considering the composition as described so far, without the tackifier. The composition would be deficient in two respects. First, in order to decrease the melt viscosity to a proper level so much resin would have to be used that the tensile strength of the said composition would be inadequate. Second, the composition would be too brittle and, therefore, subject to failure upon repeated flexing. To remedy both problems without sacrificing adhesion, a tackifying agent is added. The tackifying agent must be one which can reduce the viscosity and brittleness of the composition without being present in such large concentrations that strength is sacrificed. This requirement is best met by those tackifiers which are fluid at room temperature. The tackifier must also be one which is compatible with the other components, i.e., one which will not separate out at the lowest temperature that the adhesive can be expected to encounter once set. Suitable tackifying agents include the synthetic liquid polyterpenes, dibutylphthalate, dioctylphthalate, and tricresyl phosphate. Synthetic liquid polyterpenes are fully compatible with the other components and are preferred. The tackifier should be present in an amount between 10% and 30% by weight, with about 12% being preferred.

Hot melt adhesive compositions frequently contain small amounts of an anti-oxidant, such as butylated hydroxytoluene, to minimize degradation at melt temperatures. In the composition disclosed herein, however, small concentrations of this compound have been found to have little effect on stability but to noticeably decrease the strength of the adhesive. The use of this compund is, therefore, not preferred. The adhesive composition of this invention has adequate stability without the use of anti-oxidants.

In the following examples, it is to be understood that the specific details disclosed are merely illustrative of the present invention, and should not be construed to limit the scope thereof.

EXAMPLE I

An adhesive composition was formulated by heating together 33% by weight of an ethylene-vinyl acetate copolymer having a melt index of 20 gm/10 minutes and a vinyl acetate content of 28% by weight, sold under the name "Co-Mer EVA-505" by the Union Carbide Corporation, with 30% by weight of a paraffin wax having a melting point between 143° F and 145° F, with 24% by weight of a pentaerythritol ester of highly stabilized rosin, having a softening point of 219° F, sold under the trademark "Foral 105" by Hercules, Inc., with 12% by weight of a polyterpene resin having a molecular weight of 490 and a softening point of between 50° F and 59° F sold under the trademark "Wingtack 10" by the Goodyear Tire and Rubber Company.

The adhesive composition was placed in the glue pot of a binding apparatus similar to the one described above and applied by this apparatus to the aligned edges of sheets of paper.

The operation of the apparatus was as follows. The frame was first moved to a position so that the belt was adjacent to the discharge passageway but spaced from the sheet edges. Then, simultaneously, the valve was opened and the belt set in motion so that a portion of the belt was coated with adhesive. The valve was closed when the length of this portion corresponded to the height of the compartments containing sheets to be bound. The coated portion was then moved around to a position adjacent to these compartments, whereupon the frame was moved so that the coated belt contacted the sheet edges. After about 2 seconds the frame was moved back, withdrawing the belt from the sheets. The adhesive cooled and set within about 15 seconds after the withdrawal of the belt. During the entire operation the glue pot temperature was held at 375° F and the belt temperature was maintained at 350° F. The application operation proceeded smoothly without any stringing or balling up of the adhesive on the belt. The adhesive did not smoke or give off odors when hot, nor did its components separate upon cooling to room temperature. The cool adhesive was found to have produced a strong, flexible bond between the sheets, and to be non-blocking at room temperature.

EXAMPLE II

The adhesive composition of Example I was modified by varying the copolymer concentration between 30% and 40% by weight, the wax concentration between 25% and 35% by weight, the modified rosin concentration between 20% and 40% by weight, and the polyterpene resin concentration between 10% and 30% weight. All compositions within these ranges were found to perform satisfactorily in the apparatus of Example I.

EXAMPLE III

The adhesive composition of Example I was varied by replacing the "Foral 105" with "Foral 85", a glycerol ester of highly stabilized rosin having a softening point of 180° F, sold by Hercules, Inc. The composition was also varied by replacing the "Foral 105" with "Staybelite Ester 10", a glycerol ester of hydrogenated rosin having a softening point of 182° F, also sold by Herucles, Inc. Both modified compositions performed satisfactorily in the apparatus of Example I.

EXAMPLE IV

The adhesive composition of Example I was varied by replacing the "Wingtack 10" with each of the following: dibutylphthalate, dioctylphthalate, tricresyl phosphate, and "Hercolyn D", the latter being a fluid hydrogenated methyl ester of rosin sold by Hercules, Inc. All compositions performed satisfactorily in the apparatus of Example I.

While the preferred embodiments of the invention have been described, it should be understood that variations and alternatives will be apparent to one skilled in the art without departing from the principles herein. Accordingly, the invention is not to be limited to the specific embodiments described, but rather is to be understood by reference to the following claims.

What is claimed is:

1. A hot melt adhesive composition, having a viscosity of less than 5,000 centipoise at 250° F, comprising by weight: 30% to 40% of an ethylene-vinyl acetate copolymer; 25% to 35% of a wax; 20% to 40% of a modified rosin; and 10% to 30% of a tackifier which is fluid at room temperature.

2. The composition of claim 1, wherein the copolymer has a vinyl acetate content of between 18% and 33% by weight, and a melt index of between 15 and 30 gm/10 minutes.

3. The composition of claim 1, wherein the wax is a paraffin wax having a melting point of between 120° F and 165° F.

4. The composition of claim 1, wherein the modified rosin has a softening point of between 175° F and 225° F.

5. The composition of claim 1, wherein the tackifier is selected from the group consisting of synthetic polyterpenes, dibutylphthalate, dioctylphthalate, tricresylphosphate and hydrogenated methyl ester of rosin.

6. The composition of claim 1, wherein the copolymer has a vinyl acetate content of approximately 28% and a melt index of approximately 20 gm/10 minutes.

7. The composition of claim 6, wherein the wax is a paraffin wax having a melting point between 138° F and 165° F.

8. The composition of claim 7, wherein the modified rosin is an ester of highly stabilized rosin having a softening point of between 175° F and 225° F.

9. The composition of claim 8, wherein the tackifier is a synthetic polyterpene.

* * * * *